United States Patent
Ruppert et al.

(10) Patent No.: US 6,276,474 B1
(45) Date of Patent: Aug. 21, 2001

(54) LOW FLOOR DRIVE UNIT ASSEMBLY FOR AN ELECTRICALLY DRIVEN VEHICLE

(75) Inventors: Malcolm F. Ruppert, Hebron; Lawrence Doyle Brill, Westerville; William Carl Sullivan, Newark; Glen E. Swanson, Westerville, all of OH (US)

(73) Assignee: Rockwell Heavy Vehicle Systems, Inc., Troy, MI (US)

( * ) Notice: Subject to any disclaimer, the term of this patent is extended or adjusted under 35 U.S.C. 154(b) by 0 days.

(21) Appl. No.: 08/801,531

(22) Filed: Feb. 18, 1997

(51) Int. Cl.$^7$ .................................................. B60K 1/02
(52) U.S. Cl. .......................................... 180/65.6; 180/292
(58) Field of Search ............................... 180/65.4, 65.5, 180/65.6, 57, 292, 65.1; 296/178, 64

(56) References Cited

U.S. PATENT DOCUMENTS

| | | | |
|---|---|---|---|
| 638,643 | * 12/1899 | Newman et al. | 180/65.5 |
| 644,225 | * 2/1900 | Elsner | 180/65.6 |
| 1,251,749 | * 1/1918 | Cilley | 180/65.6 |
| 1,277,434 | 9/1918 | Leadbeater | 280/759 |
| 1,481,405 | 1/1924 | Anglada | 180/57 |
| 1,540,526 | * 6/1925 | Anglada | 180/57 |
| 1,543,044 | 6/1925 | Anglada | 180/65.6 |
| 1,735,404 | * 11/1929 | Masury | 180/65.6 |
| 1,851,068 | * 3/1932 | Swabb | 180/65.6 |
| 1,906,930 | * 5/1933 | Ledwinka | 180/57 |
| 2,093,859 | * 9/1937 | Austin | 296/178 |
| 2,462,574 | 2/1949 | Wallace | 464/171 |
| 2,589,863 | * 3/1952 | Quartullo | 180/65.4 |
| 3,186,506 | * 6/1965 | Leach et al. | 180/65.6 |
| 3,812,928 | 5/1974 | Rockwell et al. | 180/65.5 |
| 3,930,551 | 1/1976 | Cragg | 180/65.6 |
| 3,933,217 | * 1/1976 | Eichinger | 180/65.6 |
| 4,146,104 | * 3/1979 | Leembruggen | 180/65.6 |
| 4,270,622 | 6/1981 | Travis | 180/65.4 |
| 4,330,045 | 5/1982 | Myers | 180/65.5 |
| 4,469,369 | * 9/1984 | Belik et al. | 296/178 |
| 4,534,442 | * 8/1985 | Botar | 296/178 |
| 4,930,590 | * 6/1990 | Love et al. | 180/65.5 |
| 5,238,454 | 8/1993 | Schmidt | 464/99 |

FOREIGN PATENT DOCUMENTS

| | | |
|---|---|---|
| 679027 | 12/1991 | (CH) . |
| 4112624 | 10/1992 | (DE) . |
| 502313 | 3/1939 | (GB) . |
| 1303615 | 1/1973 | (GB) . |

OTHER PUBLICATIONS

International Search Report, dated Oct. 26, 1998.

\* cited by examiner

*Primary Examiner*—Frank Vanaman
(74) *Attorney, Agent, or Firm*—Carlson, Gaskey & Olds

(57) ABSTRACT

An automotive vehicle drive unit assembly which is located near the sides of a vehicle includes a first driving axle shaft, a second driving axle shaft, a first gear box, a second gear box, a first electric motor, and a second electric motor. The first driving axle shaft drives a first wheel hub of the vehicle and the second driving axle shaft drives a second wheel hub. Together the first and second driving axle shafts define an axis of rotation about which the first and second wheel hubs rotate. The first gear set drives the first wheel and the second gear set drives the second wheel. A first electric motor is mounted in an angular relationship relative to the axis of rotation and drives the first gear set. A second electric motor is mounted in an angular relationship relative to the axis of rotation and drives the second gear set. A plurality of electric motors can be used to drive each wheel hub.

13 Claims, 4 Drawing Sheets

LOW FLOOR DRIVE UNIT ASSEMBLY FOR AN ELECTRICALLY DRIVEN VEHICLE

BACKGROUND OF THE INVENTION

This invention relates to a unique drive arrangement for electrically driving the wheels of a vehicle in such a way that the floor of the vehicle may be lower than was the case in the prior art.

Mass transit vehicles, such as a bus or trolley car, typically have seats aligned at the lateral sides of the vehicle, with a central aisle extending along the vehicle. The seats are typically at a higher vertical location than the aisle, and thus cover the wheels. It would be desirable to have the aisle positioned relatively low to the ground. This would provide increased passenger space within the body of the vehicle, and may allow the designer to reduce the overall height of the mass transit vehicle. Other advantages to having a lower floor position include improved handicapped access and greater ease in the loading and unloading of passengers.

Mass transit vehicles typically have several axles which support and drive or steer the vehicle. If the axle is a driving axle, then electric motors can be used to generate torque to drive the wheels. In a typical configuration, a centrally located electric motor drives two opposed wheels at the sides of the vehicle by way of a conventional axle. Usually, transmissions or drive shafts extend from the central motor to the axle.

In the prior art, there are relatively large motor, transmission, or axle elements directly below the center of the vehicle. The aisle is typically in the center of the vehicle and normally goes over the axle, thus requiring the floor of the aisle to be relatively high. One known bus moves the floor up by steps over the axle. It is undesirable, however, to have passengers climb steps to reach the aisle and seating areas.

SUMMARY OF THE INVENTION

The subject invention relates to an automotive vehicle drive unit assembly which includes a first driving axle and a second driving axle which together define an axis of rotation. The drive unit assembly further includes a first wheel hub and a second wheel hub which are driven about the axis of rotation. A first gear set drives the first wheel hub and a second gear set drives the second wheel hub. A first electric motor is mounted at an angle relative to the axis of rotation of the first driving axle and drives the first gear set, and a second electric motor is mounted at an angle relative to the axis of rotation of the second driving axle and drives the second gear set.

This invention improves packaging and increases passenger compartment size by moving the electric motors to the sides of the vehicle. This allows the interior vehicle floor to be lowered between the motors resulting in improved utilization of the passenger compartment. Also, the flexibility of mounting the electric motors at various angles with respect to the axis of rotation of the first and second driving axles results in flexible packaging designs for other vehicle components.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF a PREFERRED EMBODIMENT

Figure 1:
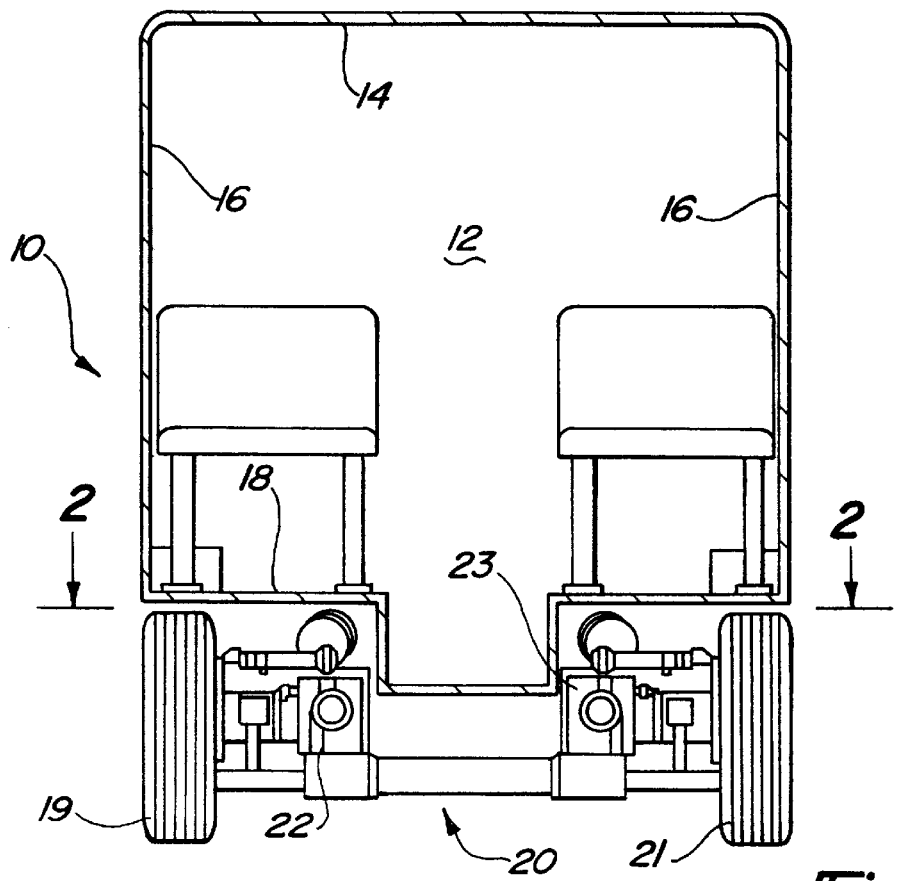
FIG. 1 is a cross sectional view of a vehicle incorporating the subject invention.

Referring to the Figures, wherein like numerals indicate like or corresponding parts throughout the several views, an automotive vehicle is shown generally at 10. As shown in FIG. 1, automotive vehicle 10 includes a passenger compartment 12 defined by a roof 14, two side walls 16, and a vehicle floor 18. A pair of wheels 19,21 are driven by an automotive vehicle drive unit assembly, generally shown at 20, which has a first unit 22 and a second unit 23. It should be understood that vehicle 10 is typically provided with a pair of drive units and several pairs of wheels.

Figure 3:
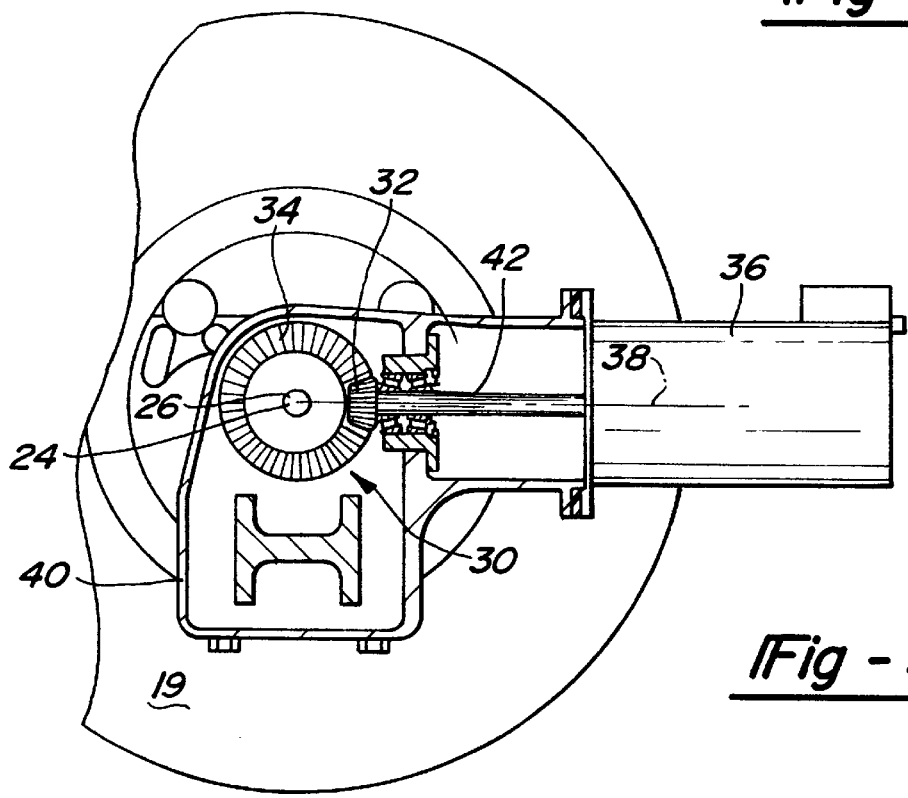
FIG. 3 is a fragmentary view from the inside of the left wheel hub as shown in FIG. 2, partially broken away and in cross section, and showing a first embodiment of an electric motor arrangement.
Figure 2A:
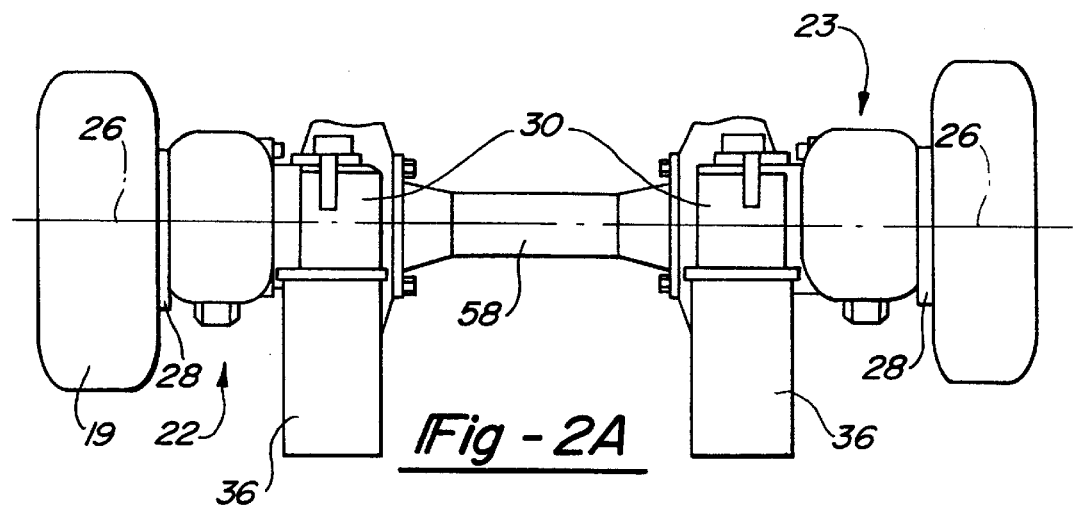
FIG. 2A is a cross sectional view taken along line 2—2 of FIG. 1, showing a first electric motor arrangement.

As shown in FIG. 2A, the first unit and second units 22 and 23 define an axis of rotation 26. As shown in FIG. 3, a first driving axle shaft 24 drives a first wheel hub 28 which revolves about the axis 26 of the first driving axle shaft 24.

A first gear set 30, located adjacent to the first wheel 19, is comprised of a pinion gear 32 and a ring gear 34 which together drive the first wheel hub 28. A first electric motor 36, defining a motor axis of rotation 38, is mounted at a non-parallel angle relative to the axis of rotation 26 of the first driving axle shaft 24. The first electric motor 36 is shown mounted in a horizontal position such that the motor axis of rotation 38 is parallel to the vehicle floor 18 and is perpendicular to the axis of rotation 26 of the first driving axle shaft 24.

As shown in FIG. 2A, drive unit assembly 20 further includes a second unit 23 comprising a second driving axle shaft 24, a second wheel hub 28, a second gear set 30, and a second electric motor 36. It is understood that the second unit 23 is a mirror image of the first unit 22. A beam 58 provides a fixed housing extending between the first 22 and second units.

Figure 2B:
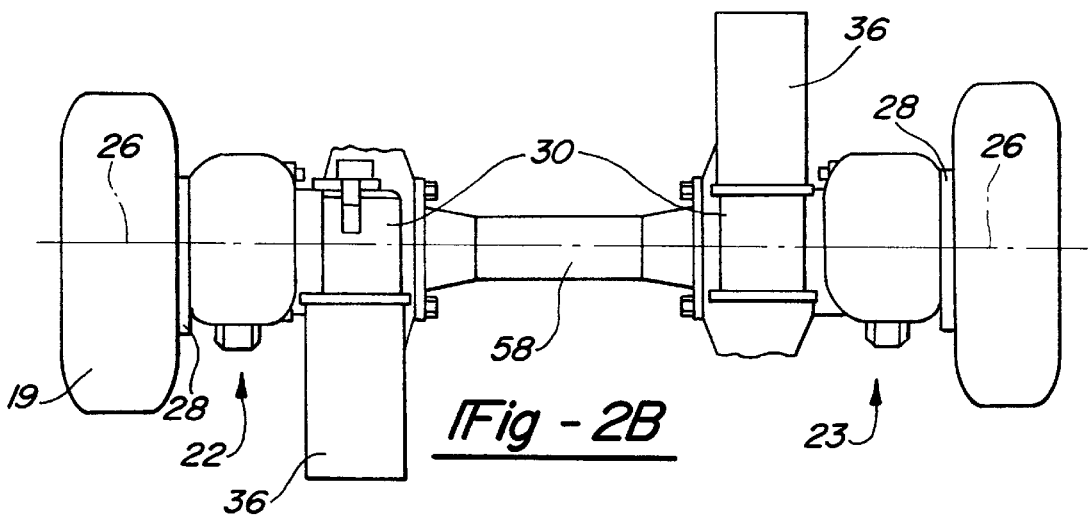
FIG. 2B is a view like FIG. 2A, but showing an alternative electric motor arrangement.

The first 36 and second 36 electric motors can be mounted in various different positions relative to each other. As shown in FIG. 2A, the first 36 and second 36 electric motors can be mounted in a generally horizontal position with both electric motors 36 extending forwardly from the beam 58. Where packaging would allow, the electric motors 36 can also be mounted such that they both extend rearwardly from the beam 58. As shown in FIG. 2B, the first 36 and second 36 electric motors can be mounted in a generally horizontal position with the first electric motor 36 extending in a forwardly direction relative to beam 58 while the second electric motor 36 extends in a rearwardly direction relative to beam 58. Arranging the configuration so that one electric motor 36 extends forwardly while the other electric motor 36 extends rearwardly can resolve electric motor weight balance issues that arise when both motors extend in the same direction from the beam 58.

Figure 4:
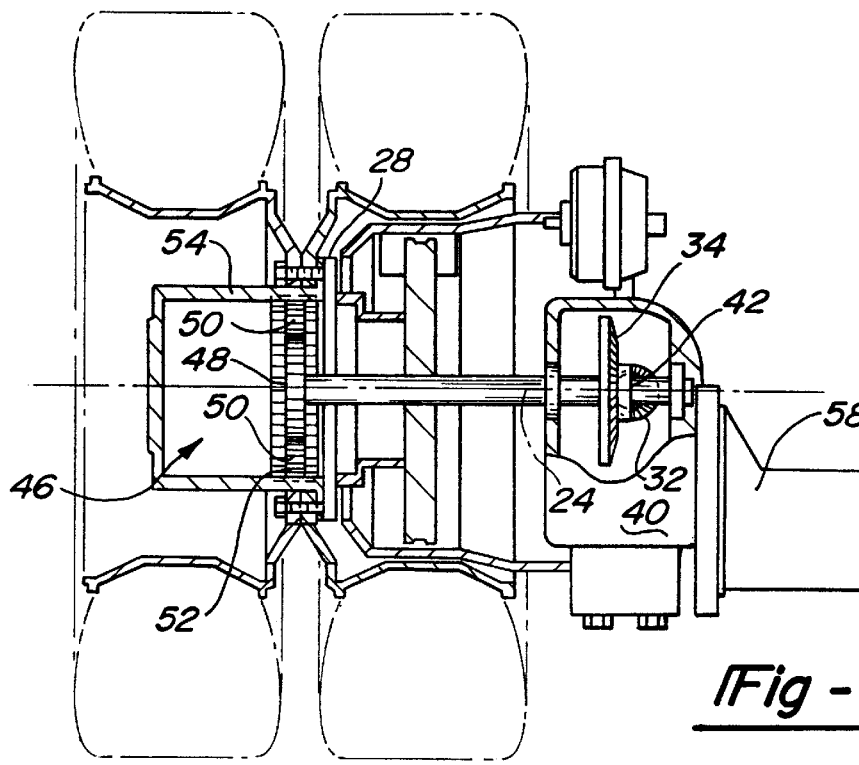
FIG. 4 is a cross section view from the front of the left wheel as shown in FIG. 3, and showing the first embodiment of an electric motor mounting arrangement.

As can be seen in FIGS. 3 and 4, a first gear box 40 houses the first gear set 30 and is rigidly connected to the first electric motor 36. A motor drive shaft 42 extends from the electric motor 36, along the motor axis of rotation 38, and drives the pinion gear 32. The pinion gear 32 meshes with the ring gear 34 which revolves about the axis 26 of the driving axle shaft 24. As the ring gear rotates, it drives the driving axle shaft 24 which turns the wheel hub 28. As can be seen in FIG. 4, gear box 40 is fixed to beam 58.

Figure 8:
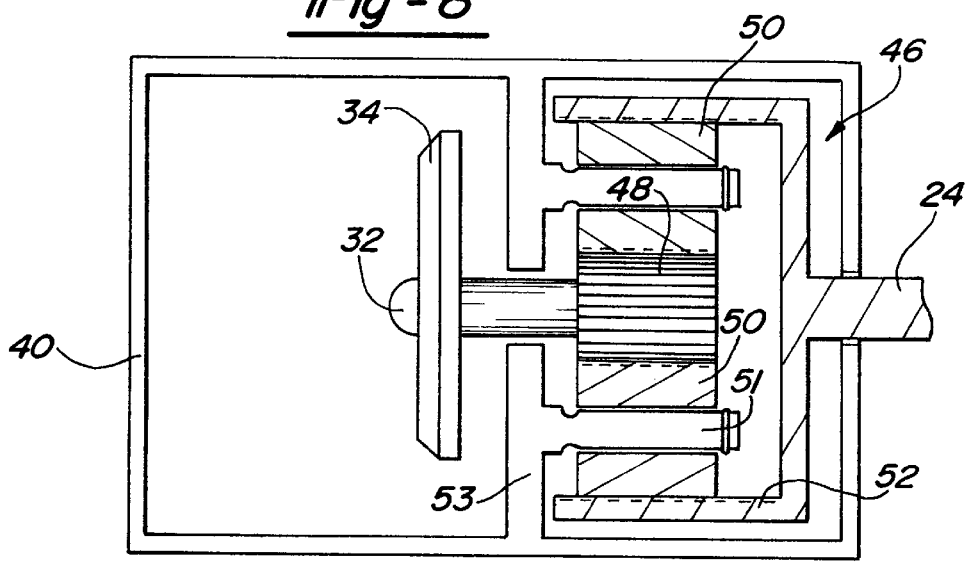
FIG. 8 is a cross sectional view of a gear box showing an alternative embodiment incorporating a planetary gear set.

A planetary gear set, shown generally at 46 in FIG. 4, can be used to achieve greater overall gear reduction. The planetary gear set 46 can either be located adjacent to the wheel hub 28 or can be incorporated into the gear box 40. The planetary gear set 46 shown in FIG. 4 is located adjacent to the first wheel hub 28 and is driven by the first driving axle shaft 24. The planetary gear set 46 shown in FIG. 8 is incorporated into the gear box 40. Regardless of its location, the planetary gear set 46 includes a sun gear 48, planet gears 50, and a ring gear hub 52. Each planet gear 50 is attached to a single planetary spider 53 by a corresponding planet pin 51, thus forming a planet gear assembly, as shown in the enlarged view of the planetary gear set 46 in FIG. 8. The planet gear assembly is inserted into the ring gear hub 52 such that the teeth of the planet gears 50 mesh with the teeth of the ring gear hub 52.

In a typical configuration there are three planet gears 50 in a planet gear assembly but it is understood that a different number of planet gears 50 can be used. When the planetary gear set 46 is located adjacent to the wheel hub 28, as shown in FIG. 4, the sun gear 48 is attached to and driven by the first driving axle shaft 24. As the sun gear 48 rotates, it meshes simultaneously with each of the planet gears 50 in the planet gear assembly. The planet gears 50 mesh with the ring gear hub 52 which results in the turning of the first wheel hub 28. The entire planetary gear set 46 is housed within a planetary hub 54 located adjacent to the first wheel hub 28. It is understood that the drive unit assembly 20 does not require a planetary gear set 46 for operation. The planetary gear set 46 is an optional feature of the drive unit assembly 20.

As shown in FIG. 8, the planetary gear set 46 can also be incorporated into the gear box 40 instead of being located adjacent to the wheel hub 28. Incorporating the planetary gear set 46 into the gear box 40 is a unique location for the planetary gear set 46. Typically, this location has been used by a differential which includes a ring gear and a pinion gear which drive axle shafts which in turn drive the wheels. With independent electric motors 36 there is no need for a differential or for any direct mechanical link between opposing wheels. By incorporating the planetary gear set 46 into the gear box 40, the need for a planetary hub 54 is eliminated which decreases the vehicle weight, gives a broader selection of wheel equipment and wheel end features, and reduces overall cost.

Figure 5:
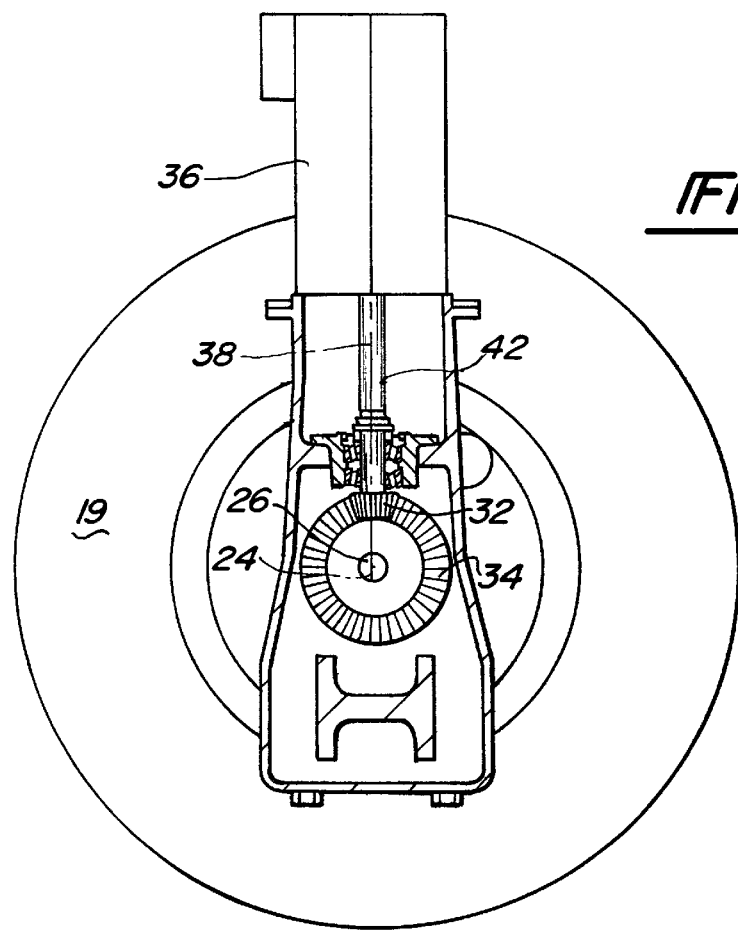
FIG. 5 is a view like FIG. 3 but showing an alternative electric motor mounting arrangement.
Figure 6:
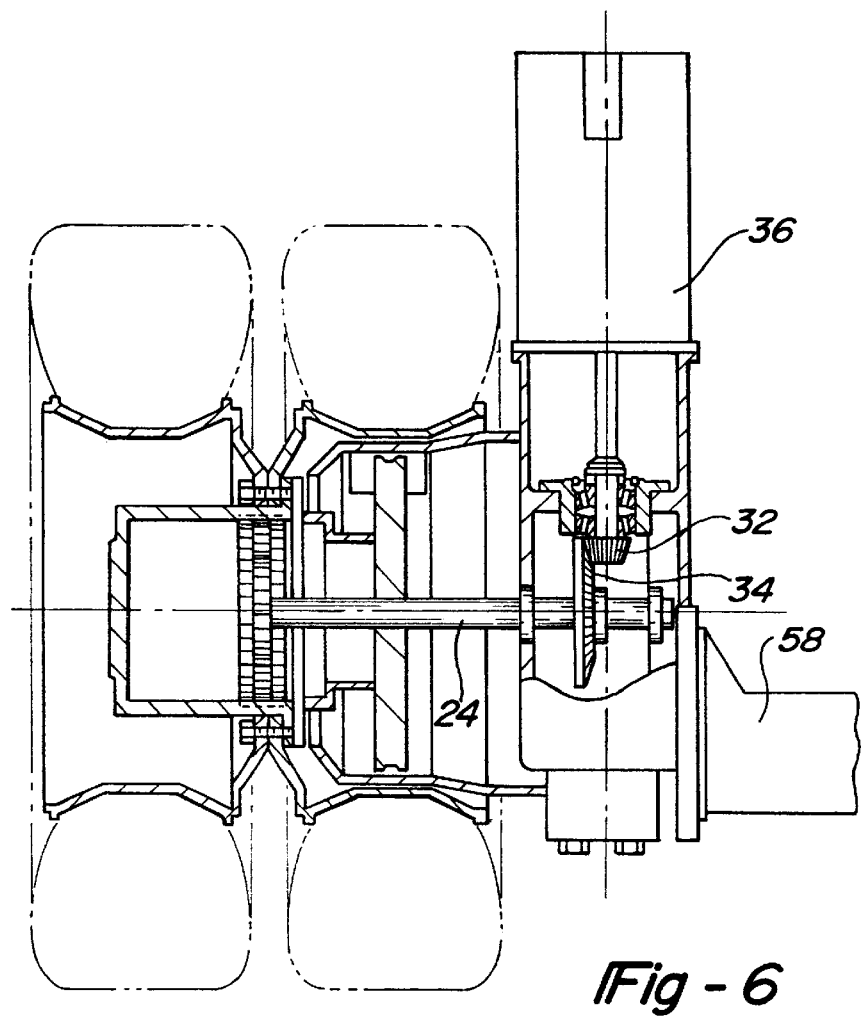
FIG. 6 is a view like FIG. 4 but showing the alternative electric motor mounting arrangement.

FIGS. 5 and 6 show an alternate embodiment of the mounting arrangement for the first electric motor 36. The first electric motor 36 is shown mounted in a vertical position such that the motor axis of rotation 38 is perpendicular to the vehicle floor 18 and is perpendicular to the axis of rotation 26 of the first driving axle shaft 24. In a typical configuration, the first electric motor 36 is mounted either in a horizontal or vertical position. However, the electric motor 36 can be mounted at any angle with respect to the vehicle floor 18 and the axis of rotation 26 of the first driving axle shaft 24.

Figure 7:
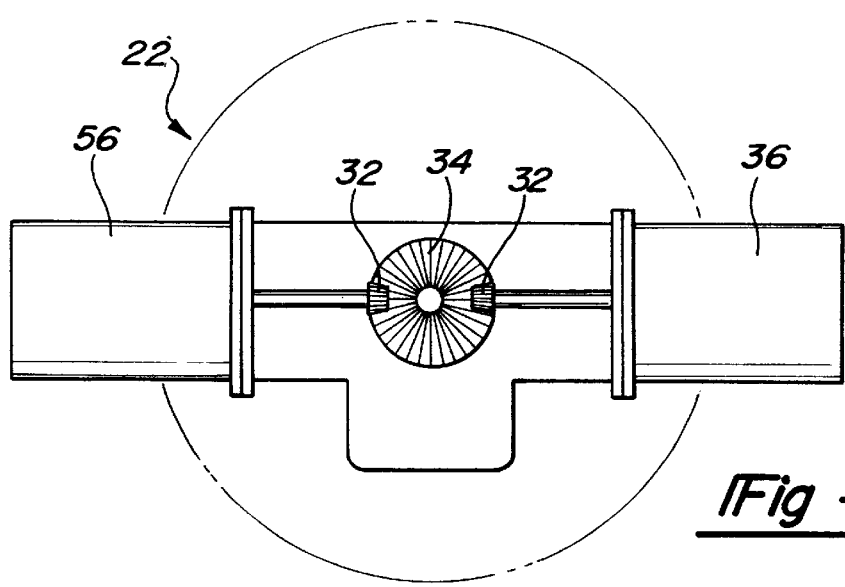
FIG. 7 is a view like FIG. 3 but showing an additional electric motor.

FIG. 7 shows an alternate embodiment of the drive unit assembly 20 in which the first unit 22 includes a third electric motor 56, in parallel driving relationship with the first electric motor 36. The third electric motor 56 is also used to drive the first gear set 30. The second unit 23 is a mirror image of the first unit 22 and includes a fourth electric motor 56, in parallel driving relationship with the second electric motor 36. The fourth electric motor 56 is use to drive the second gear set 30. The use of a third 56 and fourth electric motor 56, where packaging space is available, allows smaller gears and motors to be used, thus reducing the necessary size for the system.

With the present invention, the benefits as shown in particular in FIG. 1 are achieved. By mounting the motors at the sides of the vehicle, the center of the vehicle floor may be lowered significantly than compared to the prior art. In addition, since the motors themselves are connected to drive the wheels to a non-parallel angle, they do not extend towards the center of the vehicle from the wheel for any undue amount. Thus, the lower floor can begin at a laterally outer position. If the motors extended on an axis parallel to the axis of the wheel, the motor would require a higher floor for more of the lateral width of the vehicle.

The invention has been described in an illustrative manner, and it is to be understood that the terminology which has been used is intended to be in the nature of words of description rather than of limitation.

Another method of mounting the motors for the present invention is disclosed in co-pending patent application Ser. No. 801,532 filed on Feb. 18, 1997 entitled "Suspension Drive Unit Assembly for An Electrically Driven Vehicle". Another mounting of the motor relative to the axle of the wheel hub is disclosed in co-pending patent application Ser. No. 801,536 filed on Feb. 18, 1997 U.S. Pat. No. 5,878,830 entitled "Space Saving Connection for Electric Drive Motor to Wheel Hub".

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

We claim:

1. An automotive vehicle drive unit assembly comprising:

a first driving axle shaft;

a second driving axle shaft, said first and second driving axle shafts being co-linear and defining and axis of rotation;

a first wheel hub driven by said first driving axle shaft;

a second wheel hub driven by said second driving axle shaft, said first and second wheel hubs driven about said axis of rotation;

a first gear set for driving said first wheel hub;

a second gear set for driving said second wheel hub;

a first electric motor mounted at a non-parallel angle relative to said axis of rotation of said first driving axle shaft for driving said first gear set;

a second electric motor mounted at a non-parallel angle relative to said axis of rotation of said second driving axle shaft for driving said second gear set;

a third electric motor in parallel driving relationship with said first electric motor to drive said first gear set; and a fourth electric motor in parallel driving relationship with said second electric motor to drive said second gear set wherein said first and third electric motors drive said first gear set and said second and fourth electric motors drive said second gear set independently from each other.

2. An assembly as set forth in claim 1 wherein said first and said third electric motors extend radially from said first gear set, and said second and said fourth electric motors extend radially from said second gear set.

3. An assembly as set forth in claim 2 including first and second planetary gear sets driven by said first and second gear sets resulting in gear reduction.

4. An automotive vehicle drive unit assembly comprising:

a first driving axle shaft;

a second driving axle shaft, said first and second driving axle shafts being co-linear and defining and axis of rotation, a first wheel hub driven by said first driving axle shaft;

a second wheel hub driven by said second driving axle shaft, said first and second wheel hubs driven about said axis of rotation;

a first gear set for driving said first wheel hub;

a second gear set for driving said second wheel hub;

a first electric motor mounted at a non-parallel angle relative to said axis of rotation of said first driving axle shaft for driving said first gear set;

a second electric motor mounted at a non-parallel angle relative to said axis of rotation of said second driving axle shaft for driving said second gear set:

a third electric motor in parallel driving relationship with said first electric motor to drive said first gear set;

a fourth electric motor in parallel driving relationship with said second electric motor to drive said second gear set, said first and third electric motors extending radially from said first gear set and said second and fourth electric motors extending radially from said second gear set wherein said first and third electric motors drive said first gear set and said second and fourth electric motors drive said second gear set independently from each other; and first and second planetary gear sets driven by said first and second gear sets resulting in gear reduction wherein said first gear set includes a first pinion gear driven by said first electric motor, a second pinion gear driven by said third electric motor, said first and second pinion gears for simultaneously driving a first ring gear, and wherein said first planetary gear set includes a sun gear mounted for rotation with said first ring gear and a plurality of planet gears operatively connected to drive said first driving axle shaft wherein said first gear set and said first planetary gear set are housed within a first gearbox housing mounted to said first and third electric motors, and said second gear set includes a third pinion gear driven by said second electric motor, a fourth pinion gear driven by said fourth electric motor, said third and fourth pinion gears for simultaneously driving a second ring gear, and wherein said second planetary gear set includes a sun gear mounted for rotation with said second ring gear and a plurality of planet gears operatively connected to drive said second driving axle shaft wherein said second gear set and said second planetary gear set are housed within a second gearbox housing mounted to said second and fourth electric motors.

5. An automotive vehicle drive unit assembly comprising:

a first driving axle shaft; a second driving axle shaft, said first and second driving axle shafts being co-linear and defining and axis of rotation;

a first wheel hub driven by said first driving axle shaft;

a second wheel hub driven by said second driving axle shaft, said first and second wheel hubs driven about said axis of rotation;

a first gear set for driving said first wheel hub;

a second gear set for driving said second wheel hub;

a first electric motor mounted at a non-parallel angle relative to said axis of rotation of said first driving axle shaft for driving said first gear set;

a second electric motor mounted at a non-parallel angle relative to said axis of rotation of said second driving axle shaft for driving said second gear set; and first and second planetary gear sets driven by said first and second gear sets resulting in gear reduction, said first and second planetary gear sets being incorporated into first and second gearboxes wherein said first gear set includes a pinion gear driven by said first electric motor and a ring gear driven by said pinion, and wherein said first planetary gear set includes a sun gear mounted for rotation with said ring gear and a plurality of planet gears driven by said sun gear and operatively connected to drive said first driving axle shaft; and said second gear set includes a pinion gear driven by said second electric motor and a ring gear driven by said pinion, and wherein said second planetary gear set includes a sun gear mounted for rotation with said ring gear and a plurality of planet gears driven by said sun gear and operatively connected to drive said second driving axle shaft.

6. An assembly as set forth in claim 5 wherein said first gear set and said first planetary gear set are housed within said first gearbox which is mounted to said first electric motor and said second gear set and said second planetary gear set are housed within said second gearbox which is mounted to said second electric motor.

7. A drive unit assembly comprising:

a first driving axle shaft;

a second driving axle shaft, said first and second driving axle shafts being co-linear and defining an axis of rotation;

a first wheel hub to be driven by said first driving axle shaft;

a second wheel hub driven by said second driving axle shaft, said first and second wheel hubs driven about said axis of rotation;

a first gear set for driving said first wheel hub, said first gear set including bevel pinion gear and a bevel ring gear, with one of said bevel pinion and said bevel ring gear operatively connected to drive said first wheel hub;

a second gear set for driving said second wheel hub, said second gear set including a bevel pinion gear and a bevel ring gear with one of said bevel pinion and said bevel ring gear being operatively connected to drive said second wheel hub;

a first electric motor mounted at an angle relative to said axis of rotation of said first driving axle shaft for driving the other of said bevel pinion gear and said bevel ring gear of said first gear set;

a second electric motor mounted at an angle relative to said axis of rotation of said second driving axle shaft, and operatively connected to drive the other of said bevel pinion gear and said ring gear;

a third electric motor mounted in parallel driving relationship with said first electric motor to assist in driving said first gear set;

a fourth electric motor mounted in parallel driving relationship with said second electric motor to assist in driving said second gear set;

a first planetary gear set driven by said first gear set and a second planetary gear set driven by said second gear set wherein said first planetary gear set includes a sun gear mounted for rotation with said ring gear of said first gear set about said axis of rotation and a plurality of planet gears driven by said sun gear and operatively connected to drive said first driving axle shaft and wherein said second planetary gear set includes a sun gear mounted for rotation with said ring gear of said second gear set about said axis of rotation and a plurality of planet gears driven by said sun gear and operatively connected to drive said second driving axle shaft.

8. An assembly as set forth in claim 7 wherein said first gear set includes a second pinion gear driven by said third electric motor, said second pinion gear for additionally driving said ring gear of said first gear set, and wherein said second gear set includes a second pinion gear driven by said fourth electric motor, said second pinion gear for additionally driving said ring gear of said second gear set.

9. An assembly as set forth in claim 8 including a first housing enclosing and mounting said first gear set and said first planetary gear set to said first and third electric motors and a second housing enclosing and mounting said second gear set and said second planetary gear set to said second and fourth electric motors.

10. A vehicle comprising:

a vehicle body extending between lateral sides, passenger seats being mounted adjacent each of said lateral sides, a floor defined beneath said passenger seats, an aisle defined between said passenger seats, and said floor also extending beneath said aisle;

at least one driving axle for driving a pair of laterally spaced wheels including a first drive axle shaft associated with the first of said wheels, and a second drive axle shaft associated with the second of said wheels, said first and second drive axle shafts defining an axis of rotation;

a first and second gear set for driving said first and second wheels, said first and second gear set each including a bevel pinion gear and a bevel ring gear, with one of said bevel pinion gear and said bevel ring gear operatively connected to drive each of said first and second wheels;

a first electric motor mounted at a non-parallel angle relative to said axis of rotation of said first drive axle shaft for driving the other of said pinion gear and said ring gear of said first gear set;

a second electric motor mounted at a non-parallel angle relative to said axis of rotation of said second drive axle shaft and operatively connected to drive the other of said bevel pinion and said ring gear of said second gear set;

a third electric motor mounted in parallel driving relationship with said first electric motor to assist in driving said first gear set;

a fourth electric motor mounted in parallel driving relationship with said second electric motor to assist in driving said second gear set; and said electric motors being mounted at a vertical position which is higher than a vertical position of the floor of said aisle.

11. A vehicle as set forth in claim 10 including a first planetary gear set driven by said first and third electric motors via said first gear set for speed reduction at said first wheel and a second planetary gear set driven by said second and fourth electric motors via said second gear set for speed reduction at said second wheel.

12. A vehicle comprising:

a vehicle body extending between lateral sides, passenger seats being mounted adjacent each of said lateral sides, a floor defined beneath said passenger seats, an aisle defined between said passenger seats, and said floor also extending beneath said aisle;

at least one driving axle for driving a pair of laterally spaced wheels including a first drive axle shaft associated with the first of said wheels, and a second drive axle shaft associated with the second of said wheels, said first and second drive axle shafts defining an axis of rotation;

a first and second gear set for driving said first and second wheels, said first and second gear set each including a bevel pinion gear and a bevel ring gear, with one of said bevel pinion gear and said bevel ring gear operatively connected to drive each of said first and second wheels;

a first electric motor mounted at a non-parallel angle relative to said axis of rotation of said first drive axle shaft for driving the other of said pinion gear and said ring gear of said first gear set, and a second electric motor mounted at a non-parallel angle relative to said axis of rotation of said second drive axle shaft and operatively connected to drive the other of said bevel pinion and said ring gear of said second gear set;

a first planetary gear set driven by said first gear set and a second planetary gear set driven by said second gear set for reducing speed at said first and second wheels; and said electric motors being mounted at a vertical position which is higher than a vertical position of the floor of said aisle.

13. A vehicle comprising:

a vehicle body extending between lateral sides, passenger seats being mounted adjacent each of said lateral sides, a floor defined beneath said passenger seats, an aisle defined between said passenger seats, and said floor also extending beneath said aisle;

at least one driving axle for driving a pair of laterally spaced wheels including a first drive axle shaft associated with the first of said wheels, and a second drive axle shaft associated with the second of said wheels, said first and second drive axle shafts defining an axis of rotation;

a first and second gear set for driving said first and second wheels, said first and second gear set each including a bevel pinion gear and a bevel ring gear, with one of said bevel pinion gear and said bevel ring gear operatively connected to drive each of said first and second wheels;

a first electric motor mounted at a non-parallel angle relative to said axis of rotation of said first drive axle shaft for driving the other of said pinion gear and said ring gear of said first gear set, and a second electric motor mounted at a non-parallel angle relative to said axis of rotation of said second drive axle shaft and operatively connected to drive the other of said bevel pinion and said ring gear of said second gear set, said electric motors being mounted at a vertical position which is higher than a vertical position of the floor of said aisle; and a first planetary gear set driven by said first gear set and a second planetary gear set driven by said second gear set for reducing speed at said first and second wheels wherein said first planetary gear set includes a sun gear mounted for rotation with said ring gear of said first gear set about said axis of rotation and a plurality of planet gears driven by said sun gear and operatively connected to drive said first drive axle shaft and wherein said second planetary gear set includes a sun gear mounted for rotation with said ring gear of said second gear set about said axis of rotation and a plurality of planet gears driven by said sun gear and operatively connected to drive said second drive axle shaft.

* * * * *